May 23, 1933.  J. N. KIEP  1,910,696
HYDRAULIC COUPLING
Filed Sept. 17, 1930  7 Sheets-Sheet 2
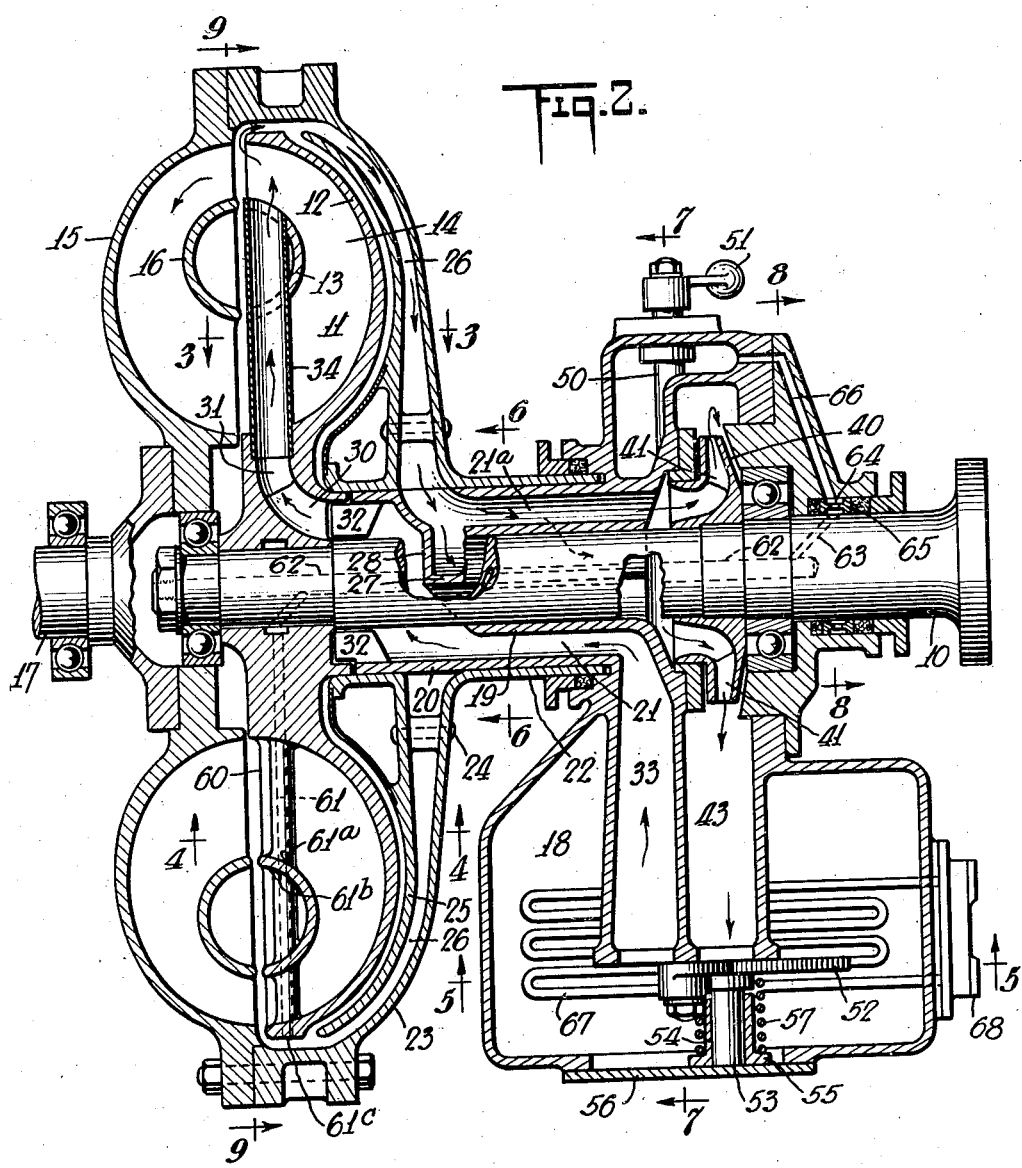

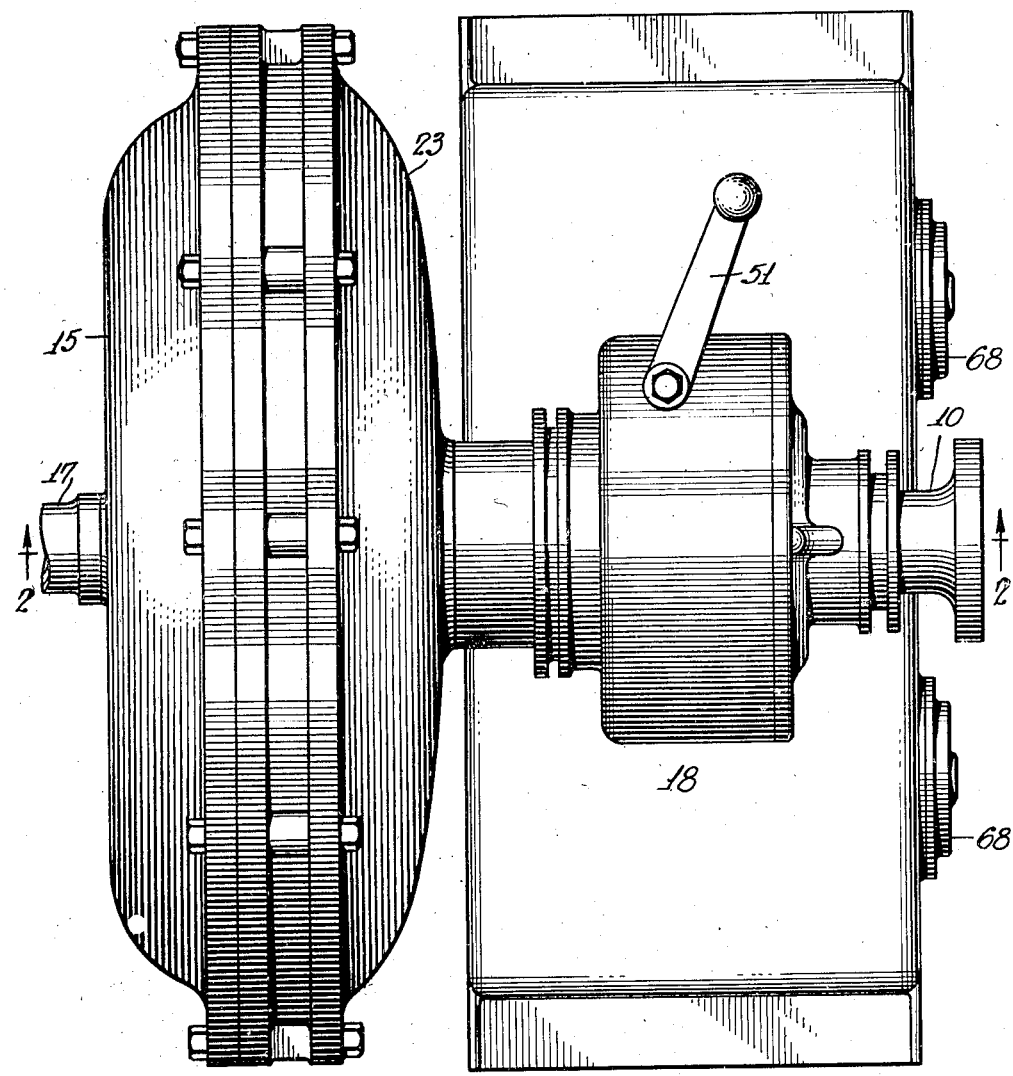

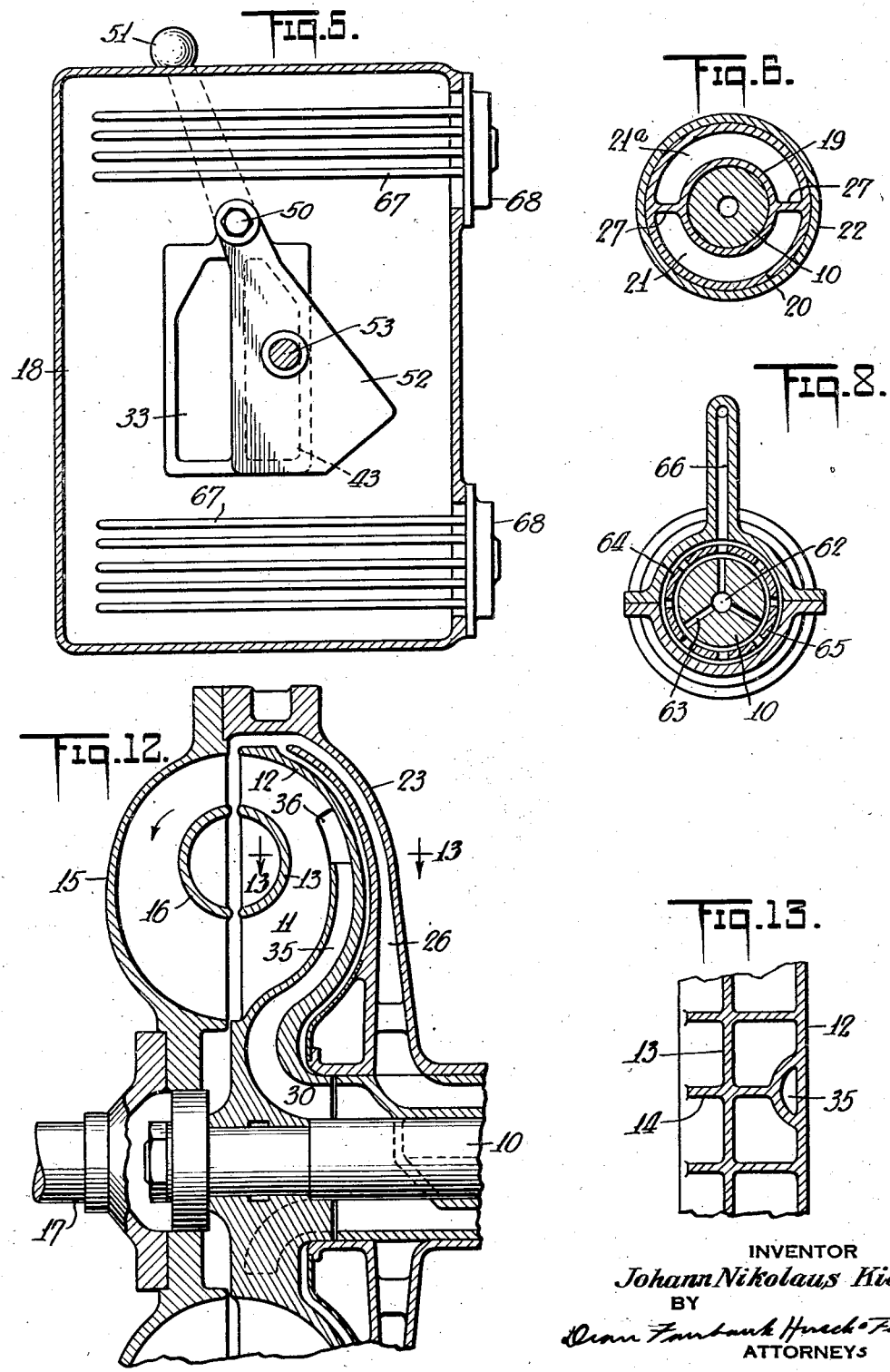

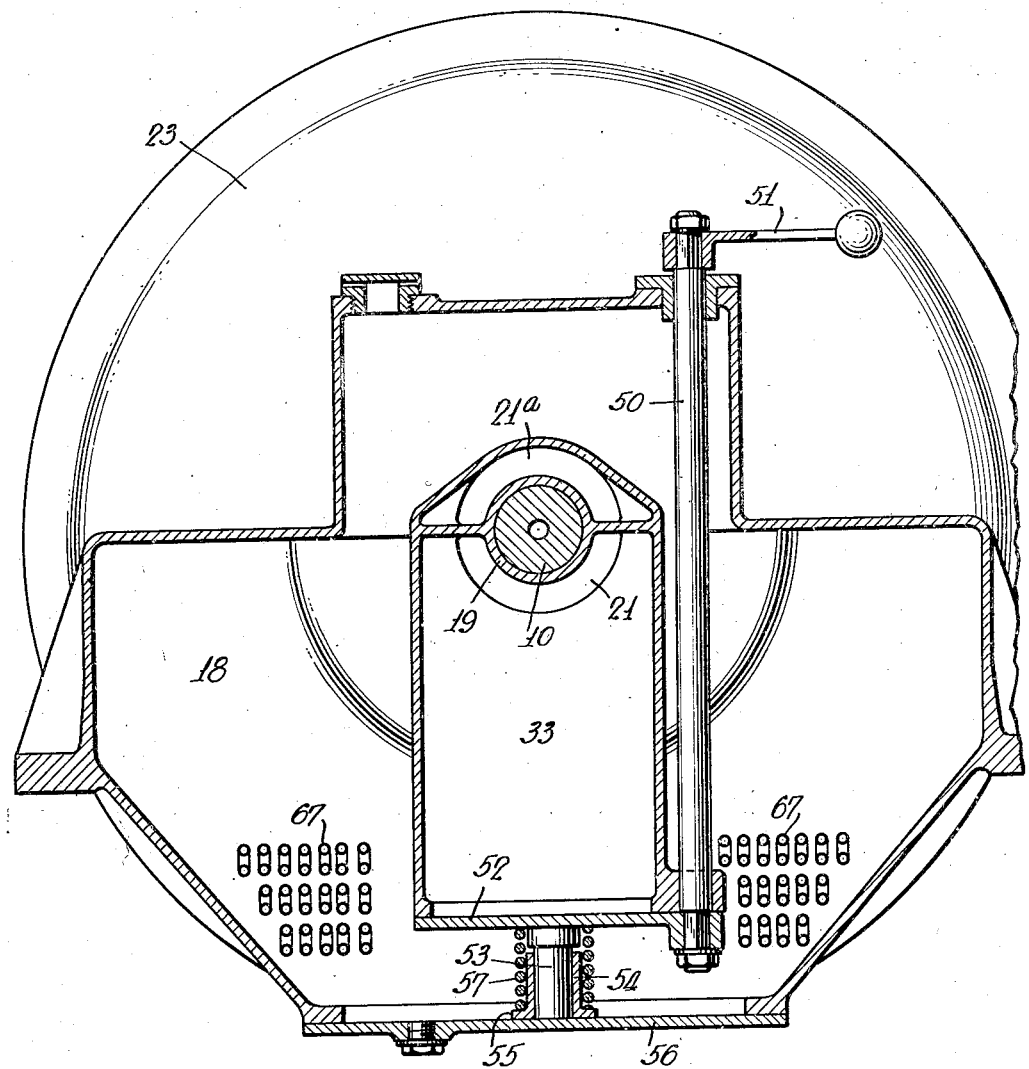

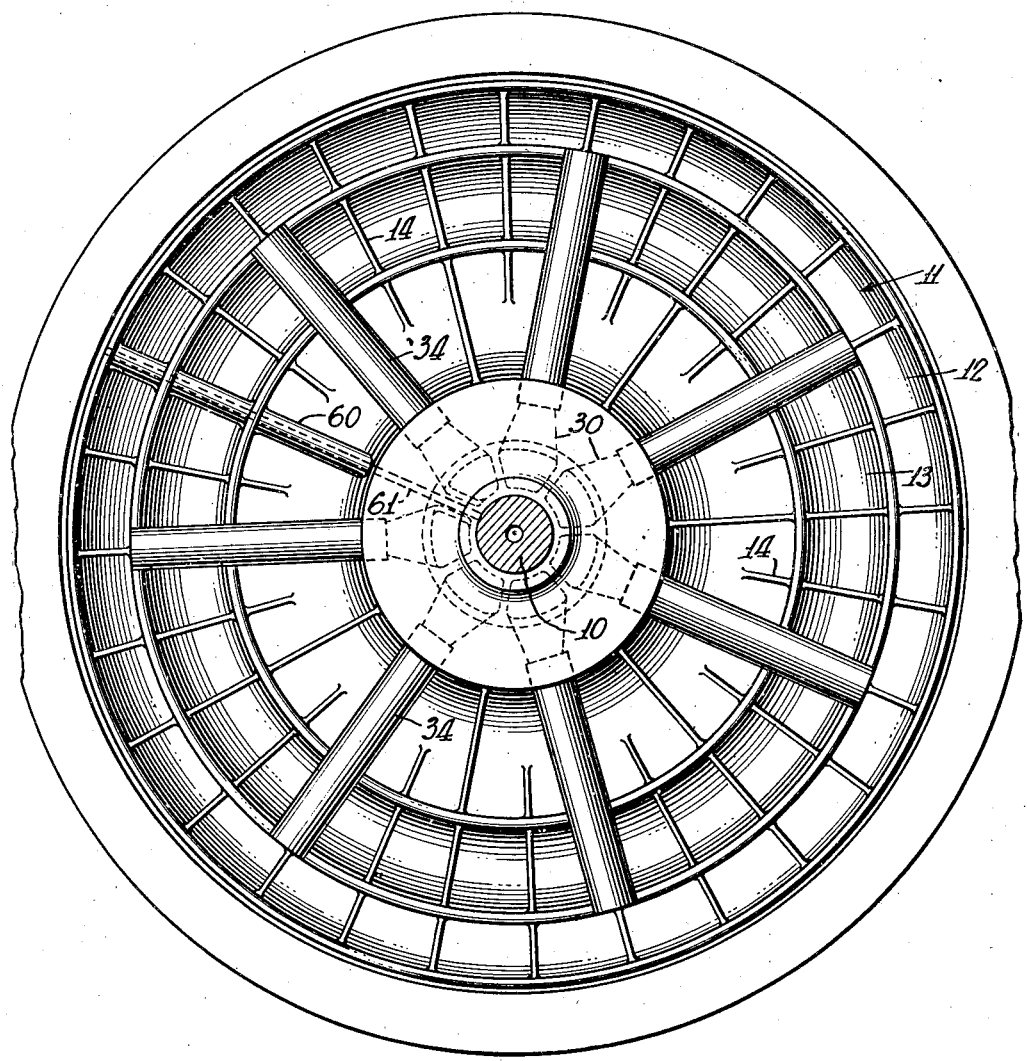

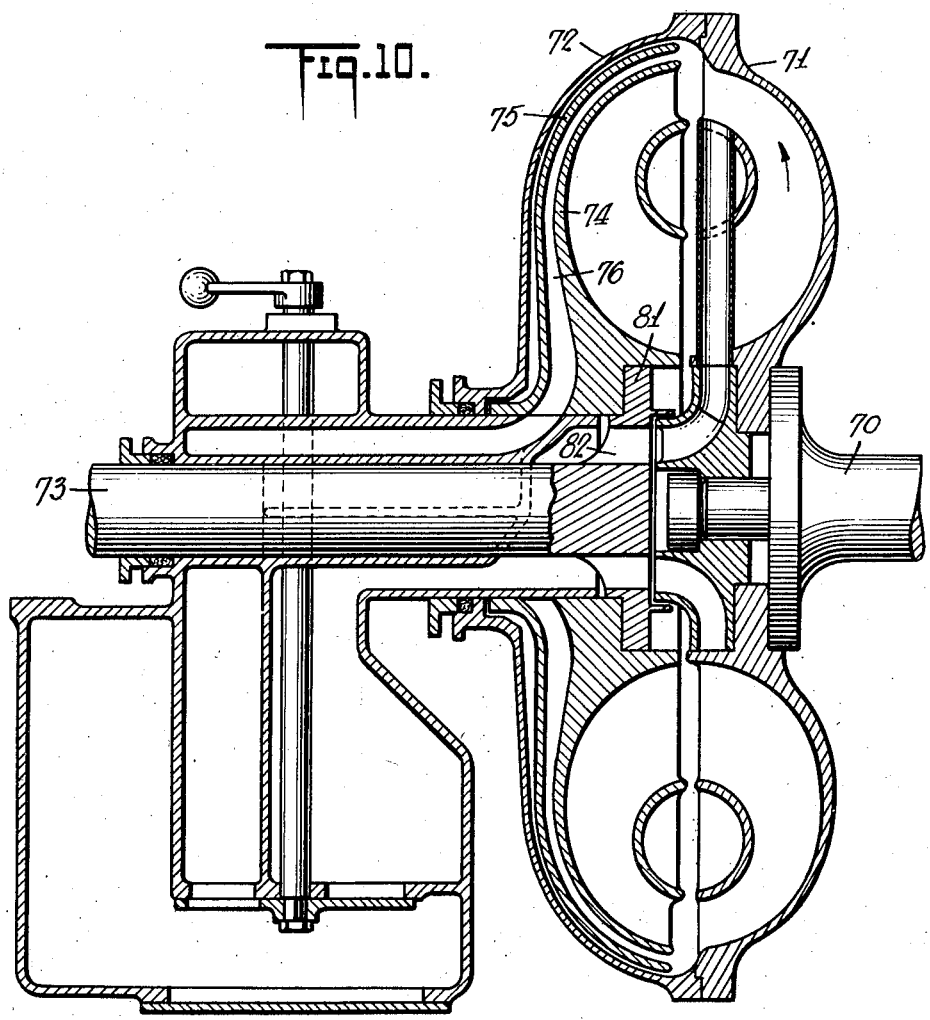

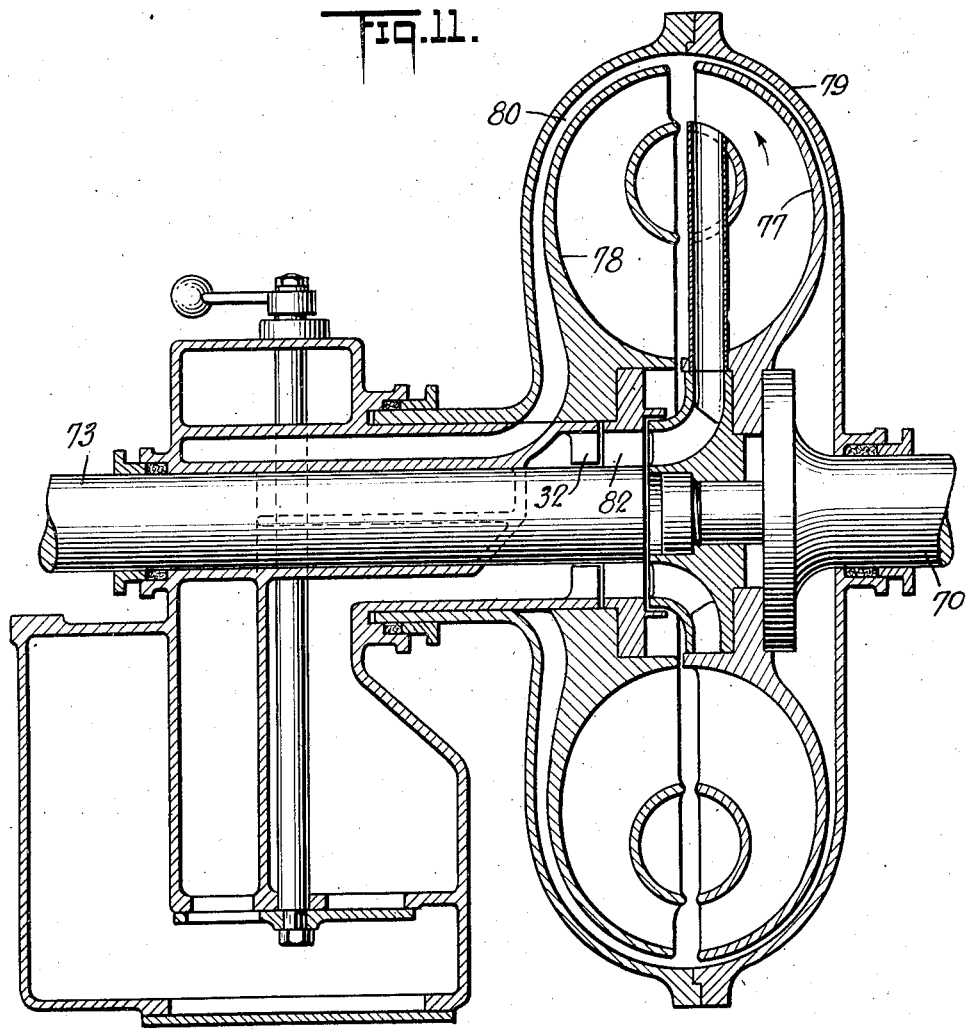

Patented May 23, 1933

1,910,696

UNITED STATES PATENT OFFICE

JOHANN NIKOLAUS KIEP, OF ALTONA-HOCHKAMP, GERMANY

HYDRAULIC COUPLING

Application filed September 17, 1930, Serial No. 482,443, and in Germany October 17, 1929.

This invention relates to the vulcan type of hydraulic power transmitter or fluid clutch in which a pair of driving and driven members are each provided with an annular series of vanes, blades or passages, and the two members are so designed and so juxtaposed that the impelling liquid while traveling in the operating circuit defined by said blades or passages effects the rotation of the driven member in response to the rotation of the driving member. Such a construction is shown and broadly claimed in the Föttinger Patent No. 1,199,359 of September 26, 1916.

In order to render the coupling operative or inoperative for power or clutching purposes, it is common practice to deliver liquid to or withdraw it from the operating circuit.

The present invention contemplates a new and improved combination of instrumentalities adapted to expedite the filling and emptying of the fluid operating circuit of a hydraulic coupling. As one feature of the invention, there is provided means for inducing the flow of impelling fluid into the operating circuit of the coupling in response to the actuation of the driving member itself. This means preferably takes the form of a centrifugal pump which is a part of the driving member and is rotatable with the latter and which serves to promote the flow of fluid into the coupling. The centrifugal pump in accordance with the present invention may comprise one or more ports leading into the operating circuit and extending in a direction adapted to subject the incoming fluid to pumping centrifugal action. The pump may also take the form of one or more passageways leading to the operating circuit and having disposed therein impeller vanes serving to give a positive propelling impulse to the incoming fluid.

In a preferred form of the present invention there are provided one or more conduits extending to a distance into the interior of the fluid operating circuit from near the axis of rotation and in a direction having a radial component. This arrangement gives a greatly increased effective pumping action as it serves to increase the influence of centrifugal action. In a specific embodiment of this feature, the inlet conduit or conduits extend to a point beyond the core of the transmitter. In another form, this conduit is curved to follow the direction of the impelling fluid in its passage through the operating circuit so that less surging is promoted in the circuit and a smoother circulation induced.

The invention also contemplates means for expediting the evacuation of the operating circuit of a coupling, and provides therefor such instrumentalities as a centrifugal pump, operated in response to the actuation of one of the members, preferably the driving member and adapted to induce the discharge of the fluid from said circuit.

The invention further provides means operated in response to the actuation of the driving member of the coupling for selectively inducing the filling or discharge of the operating circuit of said coupling.

As another feature of the present invention there is provided a discharge passage extending in a direction which conforms with the general direction of travel of impelling fluid in the operating circuit. In this manner when it is desired to evacuate the coupling the fluid leaving the operating circuit of said coupling enters the opening in the discharge passage and flows therethrough without being subjected to any general change in direction, and without, therefore, undergoing any retarding influence.

As still another feature of the present invention there is provided a reservoir tank for the impelling fluid so intimately associated with the rotating elements of the coupling as to form a compact unitary arrangement therewith. This reservoir in one specific embodiment is made integral or attached to part of the bearing means of the unit associated with either the driving or the driven shaft.

The invention still further contemplates the use of means disposed in the operating circuit of the impelling fluid for venting the air therein. This venting means has a further function of permitting a certain amount of impelling fluid to continuously pass therethrough so that a continuous flow from the reservoir tank is maintained through the operating circuit and the fluid permitted to be cooled. To aid in the cooling of said fluid, means such as cooling coils are provided in the reservoir tank, and having a suitable cooling medium passing therethrough.

The invention also consists in certain new and important features of construction and combinations of parts hereinafter set forth and claimed.

Although the novel features which are believed to be characteristic of this invention will be particularly pointed out in the appended claims, the invention itself, as to its objects and advantages, the mode of its operation and the manner of its organization may be better understood by referring to the following description taken in connection with the accompanying drawings forming a part thereof, in which Fig. 1 is a top plan view of a complete hydraulic coupling arrangement.

Fig. 2 is a longitudinal section taken on line 2—2 of Fig. 1, and showing one specific embodiment of the present invention.

Figs. 3, 4, 5, 6, 7, 8 and 9 are sections taken on line 3—3, 4—4, 5—5, 6—6, 7—7, 8—8 and 9—9 respectively of Fig. 2.

Figs. 10, 11 and 12 are longitudinal sections showing other forms of the hydraulic coupling, and Fig. 13 is a section taken on line 13—13 of Fig. 12.

Like reference characters denote like parts in the several figures of the drawings.

In the following description and in the claims, parts will be identified by specific names for convenience, but they are intended to be as generic in their application to similar parts as the art will permit.

In the specific construction shown in Figs. 1 to 9 inclusive, there is provided a driving shaft 10 having secured thereto a primary turbine wheel or driving member 11 constituted by an outer dished ring 12 and an inner dished ring 13, these rings being joined together by a plurality of vanes 14. The secondary or driven part of the coupling includes a dished ring 15 and a dished ring 16 joined together by vanes similar to vanes 14, and rotatably associated with a driven shaft 17. The dished rings 13 and 16 are juxtaposed to conjointly form the core around which the operating circuit of the impelling fluid is formed by the vanes and outer members 12 and 15.

The impelling fluid for the operating circuit is supplied from a reservoir tank 18, having integral therewith a bearing sleeve 19 which embraces the driving shaft 10. This reservoir 18 has also integral therewith a cylindrical extension 20 which surrounds the bearing sleeve 19, and which defines therewith semi-cylindrical passages 21 and 21ᵃ. This cylindrical extension 20 not only serves to partially bound the passages 21 and 21ᵃ, but also acts as a bearing for a cylindrical member 22 extending from a shell 23 secured to the ring 15. Secured to said shell 23 by means of bolts 24 is a wall member 25 which defines with said shell a discharge passage 26 connecting into the chamber 21ᵃ.

The passage 21 is partially bounded by horizontal walls 27 and vertical walls 28 extending integrally between the sleeve 19 and the extension 20. This arrangement serves to separate the two passages 21 and 21ᵃ.

In order to induce the flow of the impelling fluid from the reservoir 18 into the operating circuit of the coupling, the driving member 11 is provided with a plurality of curved ports 30 having disposed therein impeller blades 31 which serve as a centrifugal pump to propel the fluid into the coupling. In order to produce a more effective pumping action, the bearing sleeve 19 and the extension 20 may have secured thereto a plurality of guide vanes 32, arranged around a circle defined by the inlet to the ports 30. These guide vanes 32 are inclined so as to direct the liquid into the ports 30 in a direction having a component extending in the direction of rotation of the driving member.

In filling the operating circuit of the coupling, the impeller blades 31 rotating in response to the rotation of the driving member 11 induce a pumping action from the reservoir tank 18. The fluid in said tank under the influence of this pumping action flows up through a conduit 33 extending from the interior of said tank into the passage or chamber 21 through the centrifugal pumping ports 30 and into the operating circuit of the coupling.

In order to increase the pumping action of this centrifugal pump, it is preferred to have extending from the outlet thereof one or more conduits 34 reaching into the interior of the operating circuit and these conduits themselves may serve as the pump if the vanes 31 and 32 be omitted.

In accordance with this particular feature of the invention, the conduits may extend to any point within the field of action of the driving member. However, in a preferred embodiment thereof as shown in Fig. 2, the conduits 34 extend radially through the core 13 and terminate proximate that point in the operating circuit where the impelling fluid leaves the field of action of the driving member 11. In this manner as the impelling fluid is rushed into the operating circuit, the fluid will be guided directly into the inlet to the field of action of the driven member 15. This arrangement not only serves to increase the effective radius of the pump, but also reduces surging action thereby inducing smoother circulation during filling periods. This smoother operation is due to the fact that during filling periods, the driven member either is stationary or rotating at low speed, while the driving member is rotating at much higher speed. By placing the outlet of the centrifugal filling pump near the outer periphery of the driving member, the liquid as it leaves this outlet, will pass into the inlet of the driven member under the action of centrifugal force exerted by said driving member adjacent to the periphery of the coupling where centrifugal force is at the maximum. The rotation of the coupling tends to keep the liquid at the periphery of the coupling.

In another form shown in Fig. 12, the effective diameter of the centrifugal pump is increased through the agency of conduits 35, which follow the curvature of the ring 12, and which are preferably defined by wall members forming an integral part of said ring. The outlet of each of these conduits may be provided with vanes 36 to increase the pumping action of the conduits 35 and the ports 30. This arrangement serves to propel the fluid into the field of action of the driving member at an angle which approaches the direction of travel of the fluid in the operating circuit; and consequently reduces the surging action of the fluid.

In order to expedite the evacuation of the operating circuit of the coupling, means are provided preferably taking the form of a centrifugal pump operated in response to the rotation of the driving member. This centrifugal pump may comprise a pump casing 40 having disposed therein a plurality of annularly arranged impeller vanes 41, leading from the chamber 21ª and the discharge passage 26. The outlet of this centrifugal pump discharges into a conduit 43 leading into the reservoir 18.

In order to effect the selective filling or discharge of the operating circuit of the coupling, a valve mechanism is provided for opening and closing the passages 33 and 43 alternately as shown. For operating this valve mechanism, the reservoir 18 has extending therethrough a spindle 50, the upper portion of which extends outside the housing of the reservoir to receive an operating member such as a lever 51. The inner end of said spindle 50 is suitably journaled in part of the wall which defines the boundary of the conduits 33 and 43, and has affixed thereto a valve plate 52. This valve plate 52 co-operates with the openings of the conduits 33 and 43, which are disposed in the same plane. The valve 52 is yieldingly urged into seating relationship with the outlet of the conduits 33 and 43 by means which include a pin 53 depending from the underside of the valve 52 and embraced by a slidable sleeve 54 having a flange 55 which slides along a closure plate 56 of the reservoir. Cooperating with this sleeve 54 and the underside of the valve 52, and serving to keep this valve in close contact with the outlet of the conduits 33 and 43 is a coil spring 57.

When it is desired to fill the operating circuit of the coupling, the lever 51 is shifted into the position shown in Figs. 2 and 5. In this position, the outlet of the conduit 43 is closed and the inlet to the conduit 33 is open to permit the fluid to pass therethrough into the operating circuit under the influence of the centrifugal filling pump. The outlet of the discharge conduit 43 being closed, the action of the centrifugal discharge pump 40 becomes nugatory. When it is desired to evacuate the operating circuit, the lever 51 is shifted to close the inlet to the conduit 33 and to open the outlet of the conduit 43. This permits the fluid under the action of the centrifugal pump 40 to escape from the operating circuit into the reservoir 18. The intake conduit 33 being closed, the operating of the centrifugal filling pump becomes ineffective.

In order to facilitate filling and emptying, means are provided for permitting air to escape from or flow into the operating circuit. For this purpose, one or more of the vanes 60 shown in Figs. 2 and 4 are provided with a passageway 61 connected to a bore 62 extending axially of the shaft 10. This bore 62 has leading from one end thereof a passageway 63 which connects into an annular passageway 64 provided in a ring 65. This annular passageway 64 connects into a conduit 66 leading into the reservoir 18. In this manner, normal air pressure condition is maintained throughout the system and the filling of the operating circuit consequently expedited. The passage 61 has one or more ports in the coupling. As shown there is a port 61ª adjacent the inner side of the core, a port 61ᵇ within the core and an end port 61ᶜ. This vent passageway 61, after a certain period of operation serves to maintain a certain amount of circulation from the reservoir into the operating circuit. In this way, a certain amount of cooling action is imparted to the impelling fluid.

To aid in the cooling of the fluid, the reservoir 18 has immersed in the fluid therein coils 67 connected to headers 68 which may be in turn connected to any suitable source of cooling medium. If the coupling be on a motor vehicle, the radiator may supply the cooling medium.

Another means for expediting the evacuation of the operating circuit of the coupling may be effected by providing a discharge port or outlet leading from the operating circuit of the coupling and extending in the same general direction as the direction of the fluid in said circuit. One specific embodiment of this feature is shown in Fig. 10 in which a driving shaft 70 has rotatably mounted therewith a shell 71 constituting part of the driving member, and having secured thereto a casing part 72. The driven shaft 73 has rotatably mounted therewith a casing part 74 constituting part of the driven member. Disposed between said members 74 and 72 is a stationary intermediate wall 75 which serves to define with said ring 74 a discharge conduit 76. In the evacuation of the operating circuit, the fluid which is rotating in the direction indicated, escapes from the outlet of the field of action of the driving member into the discharge conduit 76. This conduit 76 extends in the same general direction as the direction of rotation of the impelling fluid in the operating circuit so that any retarding influences due to changes of direction in the fluid is obviated.

In Fig. 11 is shown another modified form of this particular feature, in which there is provided a primary turbine wheel 77 secured to the driving shaft 70. Co-operating with said turbine wheel 77 is a disc member 78 connected to the driven shaft 73. Both members 77 and 78 are enclosed within a stationary casing 79 which defines with said member 78 a discharge passageway 80. This passageway extends in the same general direction as the direction of rotation of the impelling fluid in the operating circuit so that little resistance is encountered by the discharging fluid.

Fig. 10 also shows another form of centrifugal pump for filling the operating circuit of the coupling. In this form there is provided a ring 81 secured to the driven ring 74 and having one or more vanes 82 connected thereto. During the initial stages of operation, these vanes 82 are stationary and act as guide members for the impelling fluid in its passage into the ports 30. After the driven shaft 73 has begun to rotate, however, these vanes 82 serve as impelling members. A similar feature is shown as a modification in Fig. 11 in which the vanes 82 are disposed between the inlet to the ports 30 and the stationary set of guide vanes 32.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

Having thus described my invention, what I claim as new and desire to secure by Letters Patent is:

1. A hydraulic coupling, including a driving and a driven member conjointly defining a fluid operating circuit, said driving member having one or more fluid inlet ports leading into the interior of said circuit, a conduit for delivering fluid to said ports, and one or more stationary guide vanes disposed adjacent to the inlet to said ports and serving, with said ports, to promote the flow of fluid from said conduit, into said operating circuit.

2. A hydraulic coupling, including a driving and a driven member conjointly defining a fluid operating circuit, said driving member having one or more ports leading into the interior of said circuit, and one or more vanes disposed proximate the circle of travel of the inlet to said ports and carried by the driven member, said vanes cooperating with said ports to promote the flow of fluid into said operating circuit.

3. A hydraulic coupling, including a driving and a driven member conjointly defining a fluid operating circuit, said driving member having one or more ports leading into the interior of said circuit, one or more vanes disposed proximate the circle of travel of the inlet to said ports and carried by the driven member, and one or more stationary guide vanes disposed proximate the circle of travel of the inlet to said ports, all of said vanes cooperating with said ports to promote the flow of fluid into the operating circuit.

4. A hydraulic coupling, including a driving and a driven member conjointly defining a fluid operating circuit having a core member, a centrifugal pump forming a part of the driving member, for filling said operating circuit, and including one or more conduits which extend into the interior of said operating circuit in a direction having a radial component and which are partially supported by said core member.

5. A hydraulic coupling, including a driving member and a driven member conjointly defining a fluid operating circuit having a core, and a centrifugal pump for filling said operating circuit, including one or more conduits extending into the interior of said operating circuit, and following the general direction of travel of the fluid around the core of the operating circuit.

6. A hydraulic coupling, including a dished ring forming part of the driving member, a dished ring forming part of the driven member, said rings conjointly defining the operating circuit of the impelling fluid, and one or more conduits for filling said operating circuit, and extending into the interior of said operating circuit and disposed along the driving dished ring and curved in the general direction of travel of the fluid in the operating circuit.

7. A hydraulic coupling, including a dished ring forming part of the driving member, a dished ring forming part of the driven member, said rings conjointly defining the operating circuit of the impelling fluid, one or more filling conduits extending into the interior of said operating circuit, and a vane at the delivery end of each conduit.

8. A hydraulic coupling, including a driving and a driven member conjointly defining a fluid operating circuit having a core, said coupling having a curved discharge passage leading from said operating circuit and extending in the general direction of travel of the impelling fluid about said core.

9. A hydraulic coupling, including a dished ring forming part of the driving member, a dished ring forming part of the driven member, said rings conjointly defining the operating circuit of the impelling circuit, and a stationary dished ring disposed proximate said driven ring and forming therewith a curved discharge passageway leading from the operating circuit inwardly in a direction having a radial component.

10. A hydraulic coupling, including a dished ring forming part of the driving member, a dished ring forming part of the driven member, said rings conjointly defining the operating circuit of the impelling circuit, and a stationary casing enclosing said dished rings and forming with said driven ring a curved passageway leading from the operating circuit inwardly toward the axis of rotation of the coupling.

11. A hydraulic coupling, including a driving and a driven member conjointly defining a fluid operating circuit, a reservoir for the impelling fluid, conduits for filling and discharging said operating circuit and having the open ends thereof extending into said reservoir tank, a plate valve extending across the open ends of said conduit in said reservoir, and means for shifting said valve to selectively close either one of said open ends of said conduits.

12. A hydraulic coupling, including a driving and a driven member conjointly defining a fluid operating circuit, a reservoir for the impelling fluid, conduits for filling and discharging said operating circuit and having the open ends thereof extending into said reservoir tank, a plate valve for the open ends of said conduits, and means cooperating with the walls of the reservoir tank for urging said plate valve into appositive relationship with said open ends of the conduits.

13. A hydraulic coupling, including a driving and a driven member conjointly defining a fluid operating circuit, a reservoir for the impelling fluid, conduits for filling and discharging said operating circuit and having the open ends thereof extending into said reservoir tank, a plate valve for the open ends of said conduit, and resilient means disposed between said plate valve and the walls of the reservoir and serving to urge said valve into appositive relationship with said open ends of the conduits.

14. A hydraulic coupling including a driving and a driven member conjointly defining a fluid operating circuit, a reservoir, means for filling said operating circuit in response to the rotation of the driving member, means actuated in response to the rotation of the driving member for evacuating said operating circuit, separate conduits extending from said separate means into said reservoir, and means within said reservoir for permitting or preventing flow through either conduit.

15. A hydraulic coupling including a driving and a driven member, driving and driven shafts for said members, a sleeve encircling one of said shafts, and forming therewith separate charging and discharging passages for the impelling fluid, a reservoir, means responsive to the rotation of the driving member for filling said operating circuit through said charging passage, means responsive to the rotation of the driving member for evacuating said operating circuit through said discharge passage, and a valve within said reservoir for permitting flow from said reservoir to said first mentioned means or from said second mentioned means into said reservoir.

16. A hydraulic coupling including a rotatable driving and a rotatable driven member juxtaposed to define a fluid circulating chamber, a reservoir tank for the impelling fluid, a conduit for filling said operating circuit, and a conduit for discharging said operating circuit, said conduits having open ends extending into said reservoir, means responsive to the rotation of said driving member for effecting the filling of said operating circuit through said filling conduit, means responsive to the rotation of the driving member for effecting the discharge of said operating circuit through said discharge conduit, and means for selectively closing the open end of either of said conduits.

Signed at Hamburg, Germany, this 6th day of September, 1930.

JOHANN NIKOLAUS KIEP.